(12) United States Patent
Stanhope et al.

(10) Patent No.: US 11,319,983 B2
(45) Date of Patent: May 3, 2022

(54) ARRANGEMENT FOR INTRODUCING A FORCE FROM A FASTENING ELEMENT INTO A PLASTIC COMPONENT AND METHOD FOR PRODUCING THE ARRANGEMENT

(71) Applicant: ECO Holding 1 GmbH, Marktheidenfeld (DE)

(72) Inventors: Daniel Stanhope, Nunica, MI (US); Brent Brower, Muskegon, MI (US); Matt Carlson, Whitehall, MI (US); Matt Stolzman, Muskegon, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 184 days.

(21) Appl. No.: 16/714,720

(22) Filed: Dec. 14, 2019

(65) Prior Publication Data
US 2021/0180641 A1   Jun. 17, 2021

(51) Int. Cl.
*F16B 43/00* (2006.01)
*B29C 45/14* (2006.01)
*F16B 41/00* (2006.01)
*B29L 1/00* (2006.01)

(52) U.S. Cl.
CPC ...... *F16B 43/001* (2013.01); *B29C 45/14336* (2013.01); *F16B 41/002* (2013.01); *B29L 2001/00* (2013.01)

(58) Field of Classification Search
CPC .................. F16B 43/001; B29C 45/14065
USPC .................................................. 411/533, 546
See application file for complete search history.

(56) References Cited

U.S. PATENT DOCUMENTS

| 3,147,963 | A | * | 9/1964 | Frazier | F16F 1/371 |
| | | | | | 267/30 |
| 4,113,398 | A | * | 9/1978 | Jordan | B29C 70/70 |
| | | | | | 264/279 |
| 5,150,842 | A | * | 9/1992 | Hickey | B29C 45/14065 |
| | | | | | 239/585.4 |
| 5,255,647 | A | * | 10/1993 | Kiczek | F02F 7/006 |
| | | | | | 123/195 C |
| 5,523,142 | A | * | 6/1996 | Bedoussac | B29C 37/0085 |
| | | | | | 123/634 |
| 6,457,925 | B1 | | 10/2002 | Genick, II | |
| 7,540,816 | B2 | * | 6/2009 | Yoshida | F16H 7/0848 |
| | | | | | 474/110 |
| 7,699,571 | B2 | * | 4/2010 | Booher | F16B 5/02 |
| | | | | | 411/546 |

(Continued)

FOREIGN PATENT DOCUMENTS

| EP | 2930002 A1 | 10/2015 |
| EP | 3403803 A1 | 11/2018 |

*Primary Examiner* — Gary W Estremsky
(74) *Attorney, Agent, or Firm* — Von Rohrscheidt Patents

(57) ABSTRACT

An arrangement configured to introduce a force from a fastening element into a plastic component, the arrangement including a force-limiting element that is embedded in the plastic component; wherein the fastening element is configured to fasten the plastic component at a body; wherein the fastening element is insertable through the force-limiting element, and wherein the plastic component includes a retention device which protrudes at least partially into an interior of the force-limiting element so that the fastening element that is inserted into the force-limiting element is retained in the force limiting element.

11 Claims, 2 Drawing Sheets

(56) References Cited

U.S. PATENT DOCUMENTS

| | | | | |
|---|---|---|---|---|
| 7,708,512 B2 * | 5/2010 | McLean | ............... | F16B 5/025 |
| | | | | 411/533 |
| 7,753,633 B2 * | 7/2010 | Genick, II | ............ | F16B 35/048 |
| | | | | 411/542 |
| 8,210,784 B2 * | 7/2012 | Hartmann | ............ | F16B 41/002 |
| | | | | 411/353 |
| 8,764,337 B2 * | 7/2014 | Binder | ............... | F16B 5/0233 |
| | | | | 403/343 |
| 9,494,245 B1 * | 11/2016 | Tinholt | ............ | B29C 45/14065 |
| 9,664,225 B2 * | 5/2017 | Szczukowski | ........ | F16B 41/002 |
| 2016/0356291 A1 | 12/2016 | Williams et al. | | |

* cited by examiner

ARRANGEMENT FOR INTRODUCING A FORCE FROM A FASTENING ELEMENT INTO A PLASTIC COMPONENT AND METHOD FOR PRODUCING THE ARRANGEMENT

RELATED APPLICATIONS

This application is a non provisional of U.S. provisional patent application 62/873,863 filed on Jul. 13, 2019 which is incorporated in its entirety by this reference.

FIELD OF THE INVENTION

The invention relates to an arrangement for introducing a force from a fastening element into a plastic component. The invention furthermore relates to a method for producing the arrangement.

BACKGROUND OF THE INVENTION

Generic arrangements with a force-limiting element or a compression limiter have long been known in the art.

US 2016/0356291 A1 discloses a compression limiter for limiting the compressive force exerted by a fastening element during fastening of a component to a body. Here, the compression limiter comprises a sleeve which is formed in a cylindrical form with openings at both ends and a diaphragm which is coupled to an inner surface of the sleeve. The membrane can be deformed between a first configuration, which defines a slot on the membrane with a width smaller than a diameter of the fastening element, and a second configuration. As a result of this, the slot is widened in accordance with the diameter of the fastening element so that the fastening element is held in the sleeve as a result of an elastic force exerted by the membrane.

In another embodiment U.S. Pat. No. 6,457,925 B1 discloses a force-limiting arrangement to minimize compressive forces of a bolt on a first workpiece which is fastened to a second workpiece. In this case, the force-limiting arrangement comprises a longitudinal sleeve which defines a longitudinal axis which extends between an engagement end of the first piece and an end for insertion of the bore. The end which is in engagement with the first piece has a flange which prevents the bolt from moving past, wherein the longitudinal sleeve has a retention portion with a defined inner diameter. A second portion extends through a bore in a second piece. The second piece has a defined inner diameter which is smaller than the inner diameter of the retention portion and a pressure stop surface which extends perpendicular to the longitudinal axis between the retention portion and the second portion. The force-limiting arrangement furthermore comprises a bolt holder which is accommodated in the longitudinal sleeve, wherein the bolt holder can receive the bolt to prevent the bolt from falling out of the longitudinal sleeve if the force-limiting arrangement is inserted into the first and second piece. The force-limiting arrangement furthermore comprises a knurled surface which extends around a portion of the second portion.

These known arrangements are complicated in terms of structure and use and often offer insufficient support of the arrangement or the fastening element.

BRIEF SUMMARY OF THE INVENTION

The object of the invention is therefore to structurally and functionally improve a force-limiting device cited above and thereby overcome at least one of the above-mentioned disadvantages.

According to one aspect, the object is achieved by an arrangement configured to introduce a force from a fastening element into a plastic component, the arrangement including a force-limiting element that is embedded in the plastic component; wherein the fastening element is configured to fasten the plastic component at a body; wherein the fastening element is insertable through the force-limiting element, and wherein the plastic component includes a retention device which protrudes at least partially into an interior of the force-limiting element so that the fastening element that is inserted into the force-limiting element is retained in the force limiting element.

Advantageous embodiments are provided in the dependent claims and additional independent claims.

The improved arrangement has the advantage that the fastening element can be premounted and transported together with the plastic component by means of the retention device. The fastening element is advantageously pressed or screwed into the plastic component. The customer thus does not have to separately procure, store or mount any fastening elements. The mounting time when using the arrangement is also significantly reduced for the customer by means of the premounted fastening element. By virtue of the fact that the retention device projects into the interior of the force-limiting element, it also support the force-limiting means tight in the plastic component, and thus satisfies a dual function.

In this application, the term plastic component refers to any plastic element which is to be arranged on a body with the aid of a fastening element. For example, plastic holders produced by injection molding are attached with the aid of e.g. screws to rigid or unmovable bodies. In the automotive sector, this can be used, for example, in the case of actuators for camshaft adjusters. The holder of such actuators corresponds here to an injection-molded plastic element which is attached with a steel screw to a body in the form of a vehicle body or the engine block.

In one advantageous embodiment, the force-limiting element is embedded by means of injection molding into the plastic component. For injection molding, a material is liquefied or plasticized with an injection molding machine and injected into a mold, the injection mold, under pressure. The material subsequently returns to a solid state by cooling or a cross-linking reaction and can be removed from the injection mold as a finished part. In order to achieve a connection to the force-limiting element, this is also placed in the injection mold. As a result of the over molding, the connection between the generated plastic component and the force-limiting element are formed to be particularly solid and sealing. Since, in this case, an embedding of the force-limiting element and simultaneously a generation of the plastic component with the retention device are carried out, the over molding makes the production process of the arrangement particularly efficient and low-cost.

According to the invention, the force-limiting element can be formed in a sleeve-like manner. It can also have an oval, square or triangular shape.

According to one particularly advantageous embodiment, the force-limiting element has at least one first recess. This recess is, for example, formed as a slot, a hole or a groove. In principle, the recess can have any form which makes it possible for it to be cast around with the plastic component during connection. The force-limiting element is held in a particularly stable manner in the plastic component by means of the recess. The liquefied plastic can thus flow through the recess into the interior of the sleeve-like force-limiting element.

Here, the first recess is advantageously arranged on a first opening of the force-limiting element. The force-limiting element can thus be enclosed or flowed around by the liquefied plastic component at the first opening during injection molding without covering the bearing surface to the body to which the plastic component is to be fastened. The advantages thus are in a functionally expedient structure of the arrangement with a particularly stable seat of the force-limiting element in the plastic component. The recess is easy to produce as a result of its arrangement at the opening and, as a result of the size of the recess, the extent of the inflow of the liquefied plastic, together with further process parameters of injection molding, can be influenced.

Building on this, the force-limiting element advantageously has at least one second recess, wherein the second recess is arranged on a second opening of the force-limiting element. The first and second openings are advantageously arranged opposite one another. The force-limiting element can, as a result, be enclosed or flowed around on both sides or at both openings without covering the bearing surface for the body. The seat of the force-limiting element is, as a result, formed to be even more stable and an additional inflow opening is available for the liquefied plastic into the interior of the force-limiting element.

According to the invention, the fastening element is advantageously formed as a threaded fastener, for example a screw, a bolt or a shank. The threaded fastener is a commonplace fastening element which is easy to obtain and is therefore particularly well suited for use in the force-limiting device. The fastening element advantageously has a head and a shank, wherein an external thread which projects from the shank is formed in a portion of the shank spaced apart from the head. A fastening element which has such a structure and is inserted into the plastic component offers particularly good retention. This retention is brought about by an interaction of the retention device and the projecting external thread once the external thread has been pressed or screwed through the force-limiting element in which the retention device is arranged. The fastening element can thus not get lost. At the same time, the fastening element in this position can also be moved in directions which deviate from an axial and rotational direction. In short, the fastening element has play. This can be explained in particular with the shank portion between the head and projecting thread since the diameter in this shank portion is smaller than in the shank portion of the projecting thread. As a result of this, the fastening element can be introduced in a particularly easy and comfortable manner into a mounting opening of the body and/or be placed thereon.

According to a further advantageous embodiment, the retention device in the force-limiting element forms an inner diameter which is smaller than the outer diameter of the projecting external thread. As a result of this, loss or dropping off of the fastening means can be prevented insofar as the threaded portion of the shank is pressed or screwed through the force-limiting element including the inner diameter reduced by the retention device.

In one advantageous embodiment, an internal thread is formed or can be introduced in the retention device. In the case of a formed internal thread, a fastening element formed with an external thread, advantageously a screw, can be screwed into the plastic component. In this manner, the fastening element can be guided through the plastic component particularly conveniently and without the exertion of force. The internal thread can be introduced, for example, by means of the fastening element formed with the external thread upon initial screwing into the plastic component. Thus, no additional auxiliary tools, such as, for example, a thread cutter, are required in addition to a screwdriver potentially required to fasten the plastic component in order to introduce the internal thread. The two stated embodiments make premounting of the fastening element in the plastic component significantly easier. A subsequent introduction of the internal thread furthermore reduces the precision and tolerance requirements when producing the plastic component.

In a further advantageous embodiment, the retention device is formed in one piece with the plastic component. Formed in one piece means that several elements, here the plastic component and the retention device, are formed integrally in one piece or as one part. No further components are therefore required in addition to the plastic component according to the invention for a retention function. This has cost advantages in production in particular because the plastic component and the retention device do not have to be connected in a separate working step.

According to an additional embodiment, the retention device has retention elements which are formed to be placed on the shank. For example, the retention elements can be incorporated in any desired number and from any desired direction into the interior of the force-limiting element. For example, the retention elements can be formed in a tongue-like manner and the tongue tips can be formed to be placed on the fastening element.

The retention device can furthermore advantageously be placed on the fastening element in a sealing manner. Such a sealing function is particularly important if the body on which the plastic component is to be fastened is to be protected from moisture, pressure or other external influences. The retention device thus performs a triple function. It retains, as already mentioned, both the force-limiting element and the fastening means in the plastic component and protects the body from external influences.

According to a further aspect, the object is achieved by a method for producing an arrangement as claimed in any one of the preceding embodiments. The method has similar advantages to the arrangement according to the invention and comprises the steps: providing the force-limiting element, embedding the force-limiting element into the plastic component, and inserting the fastening element through the force-limiting element.

The improved method has the advantage that the fastening element can be premounted and transported together with the plastic component by means of the retention device. The fastening element is advantageously pressed or screwed into the plastic component. This significantly simplifies mounting for a user since no fastening elements have to be procured, stored or mounted separately. The mounting time when using the arrangement is also significantly reduced for the customer. The retention device are incorporated during injection molding of the plastic component in a working step, as a result of which production of the arrangement itself is greatly simplified. It is therefore not necessary to add further components in a further working step.

In one advantageous embodiment, the embedding is performed by injection molding with a liquefied plastic. As already mentioned, as a result of this, the connection between the generated plastic component and the force-limiting element is formed to be particularly solid and sealing.

In a further advantageous embodiment, in the case of embedding the force-limiting element into the plastic component, the retention device flows into the interior of the force-limiting element. This simplifies the arrangement of the retention device and makes production particularly efficient and precise. Simultaneous embedding of the force-limiting element and arrangement of the retention device contribute overall to the efficiency and cost advantages in the production of the arrangement.

According to an additional embodiment, a spacer inserted into the force-limiting element limits the inflow of the retention device during embedding into the plastic component. As a result of this, the penetration depth of the inflowing plastic into the interior of the force-limiting element can be precisely controlled. The quality of the arrangement and the reliability of the method are thus additionally increased.

Moreover, an internal thread is advantageously incorporated into the retention device during insertion. As already mentioned, the internal thread is advantageously incorporated by means of the fastening element formed with the external thread upon initial screwing into the plastic component. No additional auxiliary tools and/or working steps to incorporate the internal thread are thus required.

BRIEF DESCRIPTION OF THE DRAWINGS

Further advantages of the invention are described in greater detail below on the basis of an advantageous embodiment with reference to the drawing figures, wherein.

DETAILED DESCRIPTION OF THE INVENTION

Figure 1:
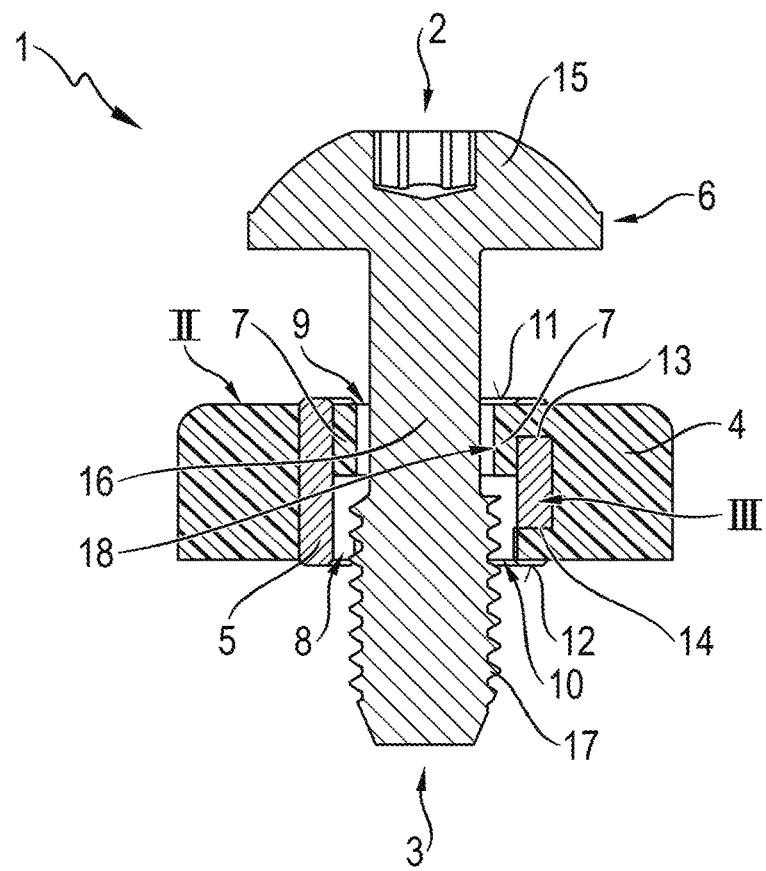
FIG. 1 illustrates a longitudinal sectional view of an arrangement according to the invention.

FIG. 1 illustrates a longitudinal sectional view of an arrangement 1 according to the invention. For the purpose of this description, an upper side 2 and a lower side 3 are initially defined. The terms upper side 2 and lower side 3 are also used to describe individual components, both in FIG. 1 and in further figures. The arrangement 1 includes a plastic component 4 into which a force-limiting element 5 is embedded. It is appreciated that the plastic component 4 and the force-limiting element 5 can have any desired configuration or form in addition to the embodiment represented herein. The force-limiting element 5 can be formed in a sleeve-like manner. It also could have an oval, square or triangular shape. The arrangement 1 furthermore includes a fastening element 6 inserted from upper side 2 through plastic component 4 and the force-limiting element 5.

The plastic component 4 has several retention devices 7 which are formed in one piece with plastic component 4 and arranged projecting into an interior 8 of force-limiting element 5. The force-limiting element 5 has a first sleeve opening 9 and a second sleeve opening 10, wherein first sleeve opening 9 is arranged on the upper side 2 and second sleeve opening 10 is arranged on the lower side 3 of force-limiting element 5. The sleeve-like force-limiting element 5 furthermore forms a first bearing surface 11 on the upper side 2 and a second bearing surface 12 on the lower side 3. Several first recesses 13 are formed in the first bearing surface 11 and several second recesses 14 are formed in the second bearing surface 12. In particular this involves three first recesses 13 and three second recesses 14 which are not all visible here as a result of the longitudinal sectional view. The plastic component 4 projects through the recesses 13, 14 and partially into an interior 8 of the force-limiting element 5. The plastic component 4 is connected in one piece to retention device 7 through first recesses 13 on first sleeve opening 9. The retention device 7 extends in the longitudinal direction only over a sub-portion of interior 8.

The fastening element 6, which is formed here as a threaded fastener, advantageously a screw, comprises on upper side 2, a head 15 from which a shank 16 extends in the direction towards the lower side 3. The shank 16 is sized in its diameter so that it still has some play in relation to retention device 7. Since the retention device 7 extends in the longitudinal direction only over a portion of an interior 8, this play is large enough so that the fastening element 6 can be particularly easily incorporated into a body opening, not represented here, or placed thereon. The body opening is arranged on a body on which the plastic component 4 is to be mounted or fastened. Otherwise, in the case of a finished, mounted state of force-limiting device 1, the head 15 is placed on first bearing surface 11 and second bearing surface 12 is placed on the body. As a result of this, the force-limiting device 5 performs its function of improving an introduction of force caused by means of the fastening element 6 into plastic component 4 to be fastened to the body.

The fastening element 6 furthermore has an external thread 17 which is formed on a portion, spaced apart from the head 15 of the shank 16. The external thread 17 projects from the shank 16. Correspondingly the retention device 7 has a corresponding internal thread 18, not visible here. The internal thread 18 is incorporated into the retention device 7 for initial guiding or screwing in of fastening element 6.

As is apparent in FIG. 1, the fastening element 6 is guided so far through the plastic component 4 and the force-limiting element 5 that the projecting external thread 17 is arranged below or spaced apart from the retention device 7 in the direction of lower side 3. The fastening element 6 thus cannot become detached from the plastic component 4 or fall out of it, for example, during transport. The retention device 7 retains the fastening element 6. The plastic component 4 and the connected retention device 7 also provide embedding and a stable support of the force-limiting element 5.

Figure 2:
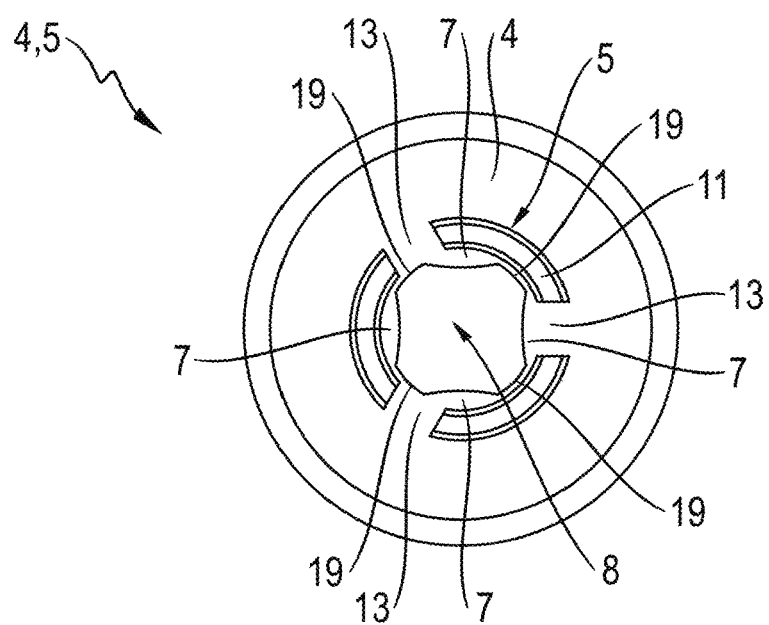
FIG. 2 illustrates detail II of FIG. 1 in a top view.

The plastic component 4 with the embedded force-limiting element 5 is represented in a top view in FIG. 2. This corresponds to a view of an upper side 2 of FIG. 1 without a fastening element 6. Thus, a first bearing surface 11 of the sleeve-like force-limiting element 5 is visible which is sub-divided by the three recesses 13. It is also apparent in FIG. 2 that plastic component 4 projects through the first recesses 13 and into the interior 8 of force-limiting element 5. As a result, the plastic component 4 is connected in one piece to retention device 7 arranged in the interior 8, here in particular to four retention devices 7.

As initially clearly visible in FIG. 2, the retention devices 7 are also connected to one another within force-limiting element 5 or in interior 8 with the aid of connecting portions 19. As a result of this, the force-limiting element 5 is particularly well embedded in plastic component 4 and thus is supported in a particularly stable manner.

Figure 3:
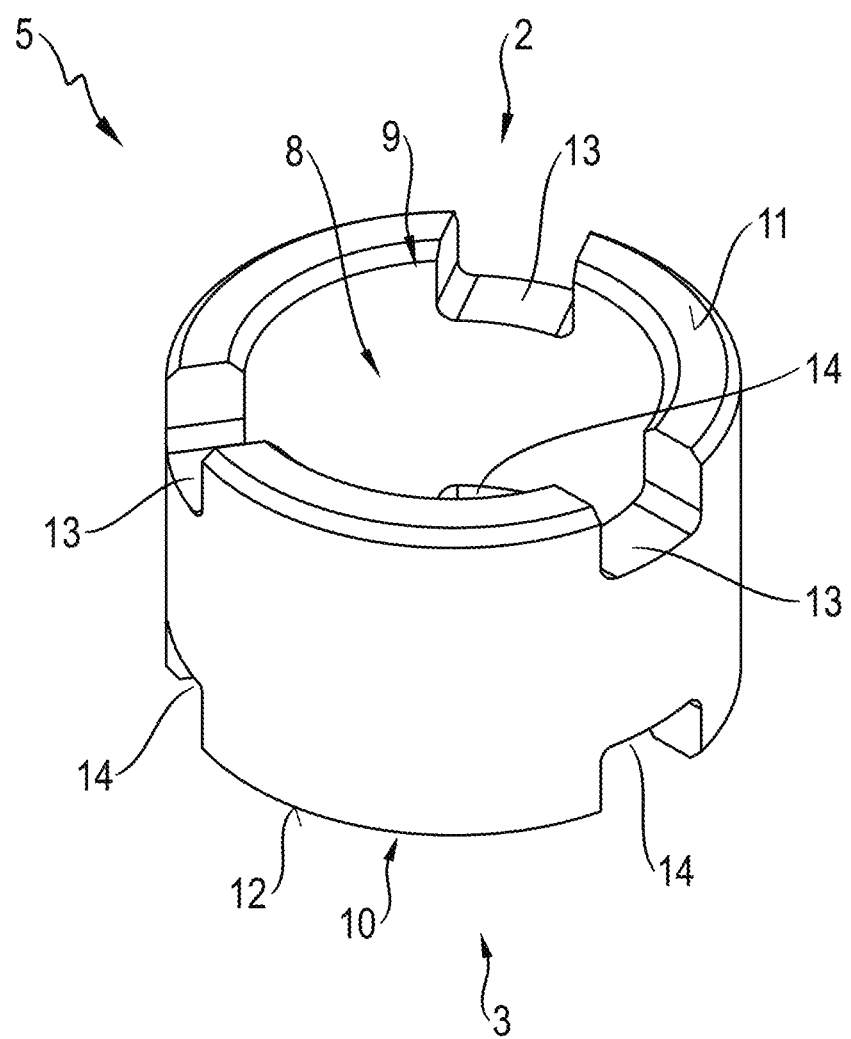
FIG. 3 illustrates detail III from FIG. 1 in a perspective view.

FIG. 3 shows the force-limiting element 5 in a perspective representation. As a result of this, the overall configuration of the force-limiting element 5 becomes evident. The sleeve-like force-limiting element 5 extends from the first bearing surface 11 arranged on upper side 2 to the second bearing surface 12 arranged on the lower side 3. The force-limiting element 5 thus forms an interior 8 which extends from first sleeve opening 9 arranged on the upper side 2 to a second sleeve opening 10 arranged on the lower side 3. Three first recesses 13 are arranged symmetrically to one another and recessed into the first bearing surface 11. Three second recesses 14 are recessed into the second bearing surface 12 and are arranged respectively opposite to one of first recesses 13 in the longitudinal direction. The function and purpose of force-limiting element 5 is described supra with reference to FIGS. 1 and 2.

The features described and shown in individual embodiments of the invention can be arranged in different combinations without departing from the spirit and scope of the invention. The scope of protection of the present invention is defined by the appended claims and is not restricted by the features described supra or shown in the drawing figures.

What is claimed is:

1. An arrangement configured to introduce a force from a fastening element into a plastic component, the arrangement comprising:
    the fastening element including a shank;
    a force-limiting element that is embedded in the plastic component;
    wherein the fastening element is configured to fasten the plastic component at a body;
    wherein the fastening element is inserted through the force-limiting element, and
    wherein the plastic component includes retention devices which protrude at least partially into an interior of the force-limiting element so that the fastening element is retained in the force limiting element,
    wherein the force-limiting element includes first recesses,
    wherein the first recesses are arranged at a first opening of the force-limiting element and open towards a first axial face of the force limiting element,
    wherein the force-limiting element includes second recesses,
    wherein the second recesses are arranged at a second opening of the force-limiting element and open towards a second axial face of the force limiting element,
    wherein the retention devices extend through the first recesses and are connected by connecting portions in the interior of the force limiting element,
    wherein the retention devices, the connecting portions and the plastic component are integrally provided in one piece,
    wherein the retention devices extend over less than an entire axial length of the force limiting element and retain the shank of the fastening element with a radial clearance,
    wherein the fastening element is formed as a threaded fastener,
    wherein the fastening element includes a head and the shank,
    wherein an outer thread that projects from the shank is formed in a portion of the shank that is offset from the head, and
    wherein the retention device in the force-limiting element includes an inner diameter which is smaller than an outer diameter of the outer thread.

2. The arrangement according to claim 1, wherein the force-limiting element is embedded in the plastic component by injection molding.

3. The arrangement according to claim 1, wherein the force-limiting element is formed as a sleeve.

4. The arrangement according to claim 1, wherein the retention devices include retention elements which are configured to be placed on the shank.

5. The arrangement according to claim 1, wherein the retention device is applicable to the fastening element in a sealing manner.

6. A method for producing the arrangement according to claim 1, the method comprising the steps:
    providing the force-limiting element;
    embedding the force-limiting element in the plastic component; and
    inserting the fastening element through the force-limiting element.

7. The method according to claim 6, wherein the embedding is performed by injection molding with a liquefied plastic material.

8. The method as claimed in claim 6, wherein the embedding of the force-limiting element in the plastic component is performed by the retention device flowing into the interior of the force-limiting element.

9. The method according to claim 6, further comprising the step:
    inserting a spacer into the force-limiting element,
    wherein the spacer limits an inflow of the retention device during embedding of the retention device in the plastic component.

10. An arrangement configured to introduce a force from a fastening element into a plastic component, the arrangement comprising:
    the fastening element including a shank;
    a force-limiting element that is embedded in the plastic component;
    wherein the fastening element is configured to fasten the plastic component at a body;
    wherein the fastening element is inserted through the force-limiting element, and
    wherein the plastic component includes retention devices which protrude at least partially into an interior of the force-limiting element so that the fastening element is retained in the force limiting element,
    wherein the force-limiting element includes first recesses,
    wherein the first recesses are arranged at a first opening of the force-limiting element and open towards a first axial face of the force limiting element,
    wherein the force-limiting element includes second recesses,
    wherein the second recesses are arranged at a second opening of the force-limiting element and open towards a second axial face of the force limiting element,
    wherein the retention devices extend through the first recesses and are connected by connecting portions in the interior of the force limiting element,
    wherein the retention devices, the connecting portions and the plastic component are integrally provided in one piece,
    wherein the retention devices extend over less than an entire axial length of the force limiting element and retain the shank of the fastening element with a radial clearance,
    wherein the connecting portions form a closed profile with eight corners and four concave surfaces and four convex surfaces that envelop the fastening element, and
    wherein the four convex surfaces limit a radial movement of the shaft of the fastening element.

11. The arrangement according to claim 1, wherein first recesses include three first recesses and the second recesses include three second recesses.

* * * * *